United States Patent
Saig

(10) Patent No.: US 9,281,975 B1
(45) Date of Patent: Mar. 8, 2016

(54) REDUCING PASS-BAND RIPPLE IN RADIO-FREQUENCY (RF) FILTERS USED FOR PASS-BAND FILTERING IN A WIRELESS COMMUNICATIONS SYSTEM

(71) Applicant: CORNING OPTICAL COMMUNICATIONS WIRELESS LTD, Airport (IL)

(72) Inventor: Maor Saig, Shaarey-Tikva (IL)

(73) Assignee: CORNING OPTICAL COMMUNICATIONS WIRELESS LTD, Airport (IL)

( * ) Notice: Subject to any disclaimer, the term of this patent is extended or adjusted under 35 U.S.C. 154(b) by 21 days.

(21) Appl. No.: 14/457,686

(22) Filed: Aug. 12, 2014

(51) Int. Cl.
| | |
|---|---|
| H03H 7/30 | (2006.01) |
| H03H 7/40 | (2006.01) |
| H03K 5/159 | (2006.01) |
| H04L 27/01 | (2006.01) |
| H04L 25/03 | (2006.01) |
| H04W 84/12 | (2009.01) |

(52) U.S. Cl.
CPC .......... *H04L 27/01* (2013.01); *H04L 25/03159* (2013.01); *H04L 25/03949* (2013.01); *H04W 84/12* (2013.01)

(58) Field of Classification Search
CPC ............... H01J 37/32174; H03F 1/565; H03F 2200/267; H04B 1/525
See application file for complete search history.

(56) References Cited

U.S. PATENT DOCUMENTS

| | | | | |
|---|---|---|---|---|
| 2008/0057897 | A1* | 3/2008 | Magnusen | H03J 3/20 455/196.1 |
| 2009/0280757 | A1* | 11/2009 | Zhu | H01Q 1/2241 455/114.1 |
| 2010/0321110 | A1* | 12/2010 | Ichitsubo | H03F 3/195 330/144 |
| 2013/0201882 | A1* | 8/2013 | Bauder | H03H 7/48 370/277 |
| 2014/0361839 | A1* | 12/2014 | Scott | H03H 7/0115 330/306 |

\* cited by examiner

*Primary Examiner* — Kenneth Lam
*Assistant Examiner* — Sung Ahn
(74) *Attorney, Agent, or Firm* — C. Keith Montgomery

(57) ABSTRACT

An electronically tunable equalizer is provided to a downlink (DL) and/or uplink (UL) signal processing path of a wireless communication unit incorporating a RF filter. The electronically tunable equalizer is pre-configured with a plurality of capacitance states, each representing a specific capacitance. The equalizer produces a different equalizer response for each of the plurality of capacitance states based on a received pass-band frequency signal. The plurality of equalizer responses is provided to the RF filter on a signaling processing path, thus affecting the RF filter's pass-band ripple. The RF filter's pass-band ripple is measured for each of the plurality of equalizer responses to determine a desired pass-band ripple. By configuring the electronically tunable equalizer to the capacitance state that produced the desired pass-band ripple, a ceramic RF filter may be used in the wireless communication unit for the benefit of lower cost and size, with reduced pass-band ripple.

21 Claims, 13 Drawing Sheets

REDUCING PASS-BAND RIPPLE IN RADIO-FREQUENCY (RF) FILTERS USED FOR PASS-BAND FILTERING IN A WIRELESS COMMUNICATIONS SYSTEM

BACKGROUND

The disclosure relates generally to wireless communications systems that support distributing communications services to remote units, and more particularly to reducing radio-frequency (RF) pass-band ripple in RF filters used for pass-band filtering of RF communications signals in wireless communication systems, including but not limited to distributed antenna system (DASs).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive RF signals from a source, such as a base station for example. Example applications where DASs can be used to provide or enhance coverage for wireless services include public safety, cellular telephony, wireless local access networks (LANs), location tracking, and medical telemetry inside buildings and over campuses.

One approach to deploying a DAS involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink RF communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N). The remote antenna units 14(1)-14(N) are also configured to receive uplink RF communications signals 20U from the client devices 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed maximum RF receiver sensitivity, so that the above-mentioned properties of the remote antenna units 14(1)-14(N) mainly determine the size of their respective remote coverage areas 10(1)-10(N).

With continuing reference to FIG. 1, the remote antenna units 14(1)-14(N) operate within a specific bandwidth in a specific RF spectrum or spectrums based on the supported communications services. This RF spectrum or spectrums is also known as pass-band frequency(ies). For instance, if a particular remote antenna unit 14 in the DAS 10 in FIG. 1 is configured to support Wi-Fi communications services, the remote antenna unit 14 may be configured to distribute downlink and uplink RF communications signals 20D, 20U in the pass-band between 2402 MHz and 2422 MHz in Industrial, Scientific, and Medical (ISM) band in the United States. Non-supported RF signals outside the pass-band may be suppressed to minimize interference to adjacent frequency bands. The client device 26 is configured to receive the downlink RF communications signals 20D in the pass-band frequency from the remote antenna units 14(1)-14(N) and suppress RF signals outside (e.g., above or below) the pass-band frequency so as to improve receiver sensitivity and performance. Also, the client device 26 is configured to transmit uplink RF communications signals 20U in a designated pass-band frequency to the remote antenna units 14(1)-14(N). Thus, RF transmitters and receivers in the remote antenna units 14(1)-14(N) can incorporate RF filters to pass desired downlink and uplink RF communications signals 20D, 20U within the pass-band frequency while attenuating unwanted RF communications signals outside (e.g., above or below) the pass-band frequency.

One type of RF filter that can be employed in the remote units 14(1)-14(N) to pass desired downlink and uplink RF communications signals 20D, 20U is a cavity RF filter. A cavity RF filter can provide high RF isolation to adjacent frequency bands of the pass-band and produce a relatively flat frequency magnitude response inside the pass-band. Another type of RF filter that can be employed in the remote antenna units 14(1)-14(N) to pass desired downlink and uplink RF communications signals 20D, 20U is a ceramic RF filter. A ceramic RF filter can also provide high RF isolation. Ceramic RF filters have cost and size advantages over cavity RF filters. However, a ceramic RF filter may suffer significant ripple in the pass-band frequency magnitude response compared to a cavity RF filter with the same bandwidth and out-of-band attenuation.

Ripple refers to fluctuations (measured in dB) in the pass-band of a RF filter's frequency magnitude response curve. In contrast to flat pass-band frequency magnitude response, ripple in a pass-band means that RF signals across the entire pass-band bandwidth will have different gains. For a downlink signal, some portions of the pass-band frequency signal will exhibit higher gain and therefore the downlink signal at these portions of the pass-band will be transmitted with higher power while other portions of the pass-band will exhibit lower gain and therefore the downlink signal at these portions of the pass-band will be transmitted with lower power. Having an equal gain across the entire pass-band bandwidth is important for getting the optimal performance. Because a RF transmitter's maximum transmit power is strictly limited by regulatory requirements, RF signals transmitted on frequencies with higher gains can maximize the output power without increasing the transmit power. RF coverage in the coverage areas 10(1)-10(N) in the DAS 12 in FIG. 1 will suffer as result of the uneven gains caused by ripple.

No admission is made that any reference cited herein constitutes prior art. Applicant expressly reserves the right to challenge the accuracy of any cited documents.

SUMMARY

Embodiments disclosed in the detailed description include reducing pass-band ripple in radio-frequency (RF) filters used for pass-band filtering in a wireless communications system. As disclosed herein, an electronically tunable equalizer is provided to a downlink (DL) and/or uplink (UL) signal processing path of a wireless communication unit incorporating a RF filter. The equalizer has an electronically tunable capacitor circuit pre-configured with a plurality of different capacitance states each representing a specific capacitance in the electronically tunable capacitor circuit. For each of the plurality of different capacitance states, the electronically tunable equalizer generates a different weighted pass-band frequency response ("equalizer response"). By combining an equalizer response generated by the electronically tunable equalizer with a native frequency response of the RF filter on the DL and/or UL signal processing path in the wireless communication unit, a pass-band ripple in a filtered pass-band frequency signal generated by the RF filter can be modified. The equalizer can be tuned to a desired capacitance state to generate a desired equalizer response that produces a reduced pass-band ripple in the filtered pass-band frequency signal, as desired. This allows a ceramic RF filter to be used in the wireless communication unit for the benefit of lower cost and size, over a cavity RF filter for example, with reduced pass-band ripple for improved performance.

To determine the desired capacitance state for the electronically tunable equalizer, at each of the plurality of different capacitance states, the electronically tunable equalizer can be electronically tuned to generate a plurality of different equalizer responses for pass band frequency signals. The pass-band ripple in the filtered pass-band frequency signal is measured for each of the plurality of different equalizer responses to determine which equalizer response produces the desired reduced pass-band ripple in the filtered pass-band frequency signal.

One embodiment of the disclosure relates to a RF pass-band ripple tuning system for reducing pass-band ripple introduced by a RF filter in a wireless communications system. The RF pass-band ripple tuning system comprises an electronically tunable equalizer and a RF filter. The electronically tunable equalizer comprises a pass-band RF signal input, at least one resonator, an electronically tunable capacitor circuit, a weighted pass-band RF signal output, and an attenuator. The pass-band RF signal input is configured to receive a wireless pass-band signal. The at least one resonator is coupled to the pass-band RF signal input configured to generate at least one resonance frequency on at least one resonator output based on the wireless pass-band frequency signal and at least one internal capacitance. The electronically tunable capacitor circuit comprises a plurality of capacitance states, a capacitance state input, and a capacitance state selector. The capacitance state input is configured to receive a selected capacitance state among the plurality of capacitance states. The capacitance state selector is configured to couple the selected capacitance state received from the capacitance state input to the at least one resonator to modify the at least one resonance frequency on at least one resonator output based on the selected capacitance state. The resonator output is coupled to a weighted pass-band RF signal output to provide a weighted pass-band frequency signal for the wireless pass-band frequency signal received on the pass-band RF signal input. The attenuator is coupled across the pass-band RF signal input and the weighted pass-band RF signal output. The RF filter is configured to receive the weighted pass-band frequency signal and filter the weighted pass-band frequency signal in the wireless pass-band frequency signal to generate a filtered pass-band frequency signal.

An additional embodiment of the disclosure relates to a method for reducing pass-band ripple in a RF filter in a wireless communication system. The method comprises for each next capacitance state among a plurality of capacitance states in an electronically tunable equalizer, instructing an electronically tunable equalizer to select a next capacitance state among the plurality of capacitance states. For each next frequency step among a plurality of frequency steps of a received pass-band frequency signal, the method further comprises receiving a pass-band frequency signal defined by a next frequency step, generating a weighted pass-band frequency signal for the pass-band frequency signal defined by the next frequency step for the next capacitance state, passing the weighted pass-band frequency signal through a RF filter to generate a filtered pass-band frequency signal defined by the next frequency step for the next capacitance state, measuring a next output power level of the filtered pass-band frequency signal, and storing the next output power level of the filtered pass-band frequency signal defined by the next frequency step for the next capacitance state. After generating the filtered pass-band frequency signals for the pass-band frequency signals defined by each of the plurality of frequency steps, the method further comprises calculating and storing a next pass-band ripple for the next capacitance state based on stored output power levels of the filtered pass-band frequency signal. After measuring and storing the pass-band ripples for each of the plurality of capacitance states in the electronically tunable equalizer, the method further comprises selecting a desired pass-band ripple from stored pass-band ripples and configuring the electronically tunable equalizer to a capacitance state produced the desired pass-band ripple.

An additional embodiment of the disclosure relates to a non-transitory computer-readable medium having stored thereon computer executable instructions. The computer executable instructions cause an electronically tunable equalizer in a radio-frequency (RF) pass-band ripple tuning system to adjust a pass-band ripple in a RF filter in a wireless communications system, by, for each next capacitance state among a plurality of capacitance states in an electronically tunable equalizer, instructing the electronically tunable equalizer to select a next capacitance state among the plurality of capacitance states. The computer executable instructions also cause the electronically tunable equalizer, for each next frequency step among a plurality of frequency steps of a received pass-band frequency signal, to measure a next output power level of a filtered pass-band frequency signal generated by a RF filter based on a weighted pass-band frequency signal generated by the electronically tunable equalizer for the next frequency step for the next capacitance state, to provide a next filter output power level for the filtered pass-band frequency signal, and storing the next output power level of the filtered pass-band frequency signal defined by the next frequency step for the next capacitance state. The computer executable instructions also cause the electronically tunable equalizer to, for the next capacitance state among the plurality of capacitance states in an electronically tunable equalizer, calculate a next pass-band ripple for the next capacitance state based on stored output power levels of the filtered pass-band frequency signal, and store the next pass-band ripple for the next capacitance state. The computer executable instructions also cause the electronically tunable equalizer to select a desired pass-band ripple from stored pass-band ripples, and configure the electronically tunable equalizer to a capacitance state produced the desired pass-band ripple.

Additional features and advantages will be set forth in the detailed description which follows, and in part will be readily apparent to those skilled in the art from the description or recognized by practicing the embodiments as described in the written description and claims hereof, as well as the appended drawings.

The foregoing general description and the following detailed description are merely exemplary, and are intended to provide an overview or framework to understand the nature and character of the claims. The drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments will be further clarified by the following examples. A wireless communication system includes radio-frequency (RF) filters for various purposes. One type of RF filter is known as a band-pass filter, which works on a downlink (DL) or a uplink (UL) signal processing path in a wireless communication equipment to pass desired RF signals inside a predefined frequency range ("pass-band frequency") and reject unwanted RF signals outside the predefined frequency range. For example, a cavity filter and a ceramic filter can both be configured to provide the band-pass filter functionalities. In many real-world implementations, the ceramic filter may be more preferable than the cavity filter because the ceramic filter is smaller and less expensive than the cavity filter. One of the known shortcomings of the ceramic filter is that the ceramic filter generates larger ripple in a pass-band frequency signal than the cavity filter does in the pass-band frequency signal, thus negatively impacting RF coverage and RF receiver performance. Hence, it is desirable to reduce ceramic filter pass-band ripple for improved RF performance in the wireless communication system.

In aspects disclosed herein, an electronically tunable equalizer is provided to a DL and/or UL signal processing path of a wireless communication unit incorporating a RF filter. The electronically tunable equalizer has an electronically tunable capacitor circuit pre-configured with a plurality of different capacitance states each representing a specific capacitance in the electronically tunable capacitor circuit. For each of the plurality of different capacitance states, the electronically tunable equalizer generates a different weighted pass-band frequency response ("equalizer response"). By combining an equalizer response generated by the electronically tunable equalizer with a native frequency response of the RF filter on the DL and/or UL signal processing path in the wireless communication unit, a pass-band ripple in a filtered pass-band frequency signal generated by the RF filter can be modified. The electronically tunable equalizer can be tuned to a desired capacitance state to generate a desired equalizer response that produces a reduced pass-band ripple in the filtered pass-band frequency signal, as desired. This allows, for example, a ceramic RF filter to be used in the wireless communication unit for the benefit of lower cost and size, over a cavity RF filter for example, with reduced pass-band ripple for improved performance.

Figure 1:
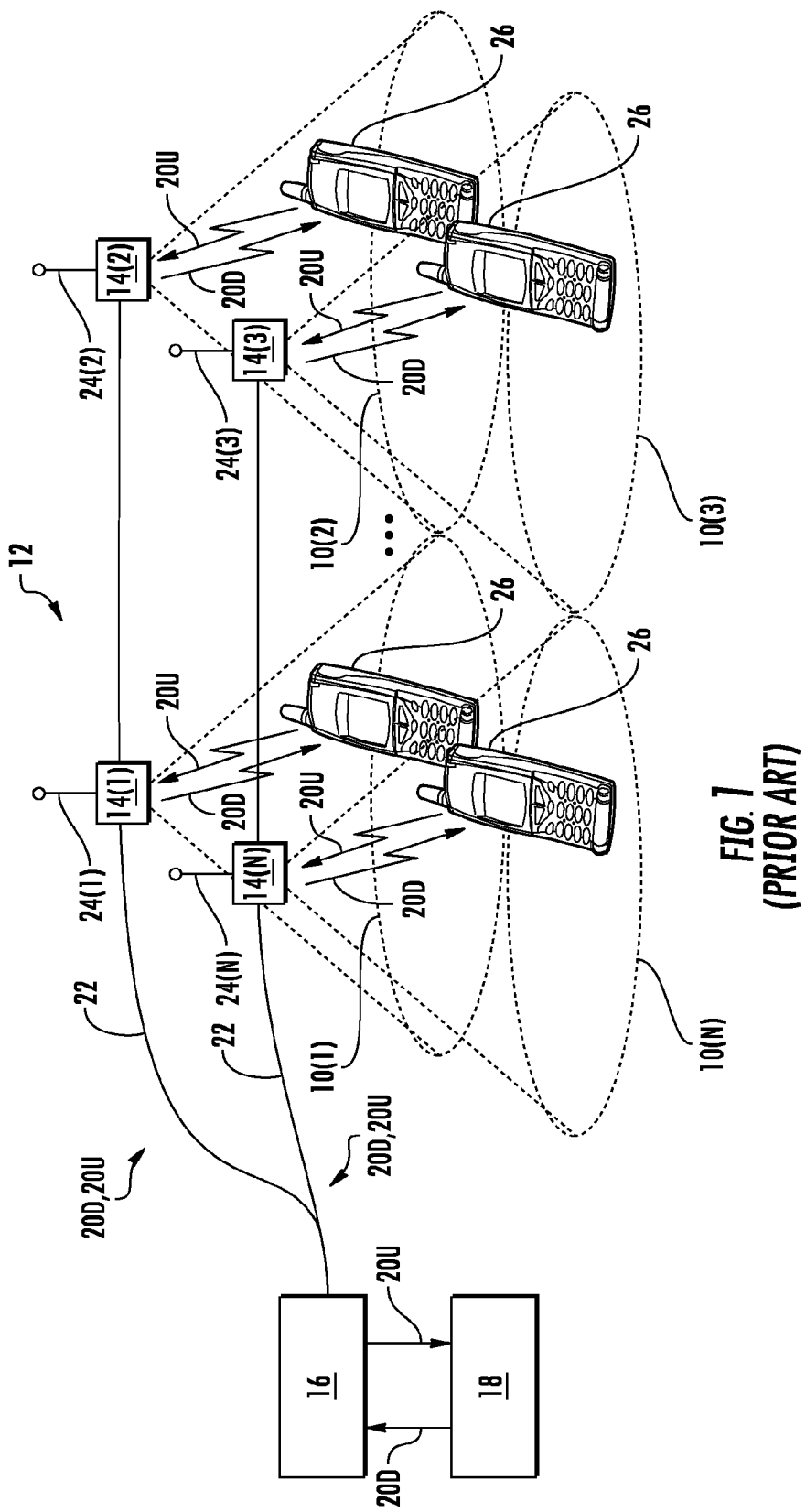
FIG. 1 is a schematic diagram of an exemplary wireless distribution system (WDS) in the form of a distributed antenna system (DAS)
Figure 2:
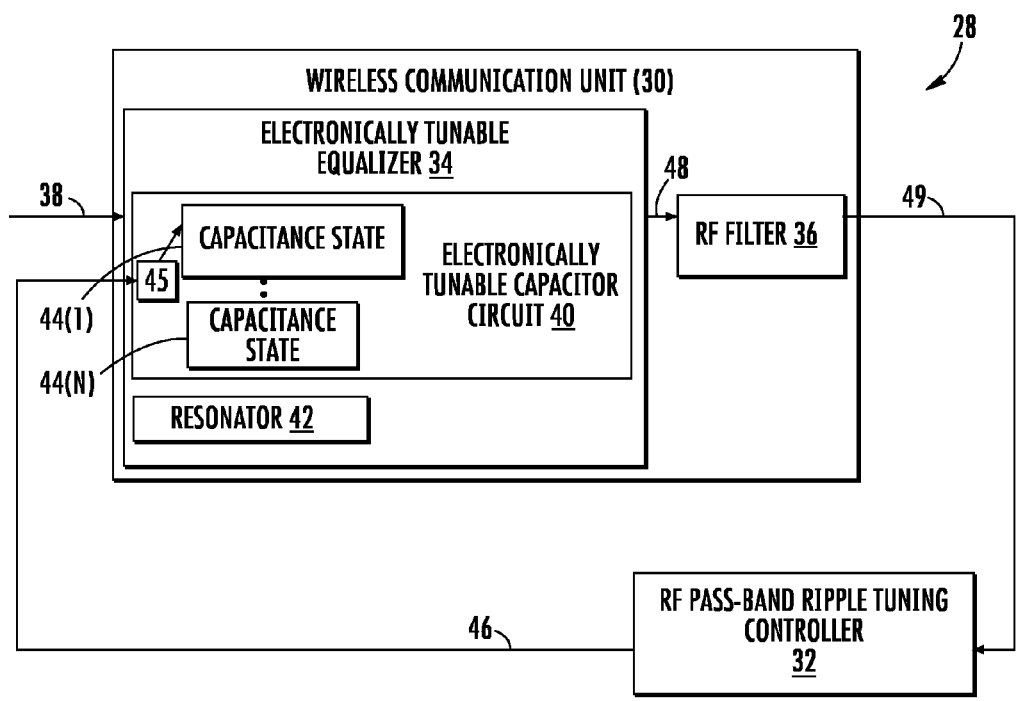
FIG. 2 is a schematic diagram of an exemplary RF pass-band ripple tuning system.

In this regard, FIG. 2 provides a schematic diagram of an exemplary RF pass-band ripple tuning system. The RF pass-band ripple tuning system 28 comprises a wireless communication unit 30 in this example. The wireless communication unit 30 is tuned to generate a desired pass-band ripple by equalizing pass-band ripple to a required level. In this regard, a RF pass-band ripple tuning controller 32 is provided that controls an electronically tunable equalizer 34. The electronically tunable equalizer 34 is controlled by RF pass-band ripple tuning controller 32 so as to generate a desired frequency response to reduce pass-band ripple introduced by an RF filter 36. The RF filter 36 is configured to filter a pass-band frequency signal 38 input into the wireless communication unit 30. For example, the RF filter 36 may be a ceramic RF filter that can provide high out-of-band attenuation or high uplink RF isolation, but may also suffer significant ripple. Thus, the RF pass-band ripple tuning system 28 is employed to reduce the ripple introduced by the RF filter 36. In this regard, aspects of the RF pass-band ripple tuning system 28 are described next, followed by descriptions of the RF pass-band ripple tuning controller 32.

With continuing reference to FIG. 2, the equalizer 34 includes an electronically tunable capacitor circuit 40 and at least one resonator 42 ("resonator 42"). The electronically tunable capacitor circuit 40 is configured with a plurality of capacitance states 44(1)-44(N). Each of the plurality of capacitance states 44(1)-44(N) corresponds to a specific capacitance. In this example, each plurality of capacitance states 44(1)-44(N) has a different capacitance. A capacitance state selector 45 is provided in the electronically tunable equalizer 34 that is configured to select a capacitance state among the plurality of capacitance states 44(1)-44(N) based on a capacitance state input 46 received from the RF pass-band ripple tuning controller 32. By the electronically tunable capacitor circuit 40 being coupled to the at least one resonator 42, the capacitance state selected by the capacitance state selector 45 among the plurality of capacitance states 44(1)-44(N) modifies at least one resonance frequency of the at least one resonator 42. When the electronically tunable equalizer 34 generates a weighted pass-band frequency signal 48 based on the received pass-band frequency signal 38, the weighted pass-band frequency signal 48 has a frequency response ("equalizer response") that is modified by the at least one resonator frequency generated by the at least one resonator 42. The RF filter 36, on the other hand, has a native frequency response ("filter response").

A frequency response is a quantitative measurement of a wireless system's or device's gain and phase changes in an operating frequency band. The frequency response may be plotted as a curve that shows the gain of the wireless system or device measured in decibels (dB) versus a frequency of the signals, measured in Hertz (Hz), that is fed to the wireless system or device, as can be seen in FIGS. 3A-3C discussed below.

Figure 3:
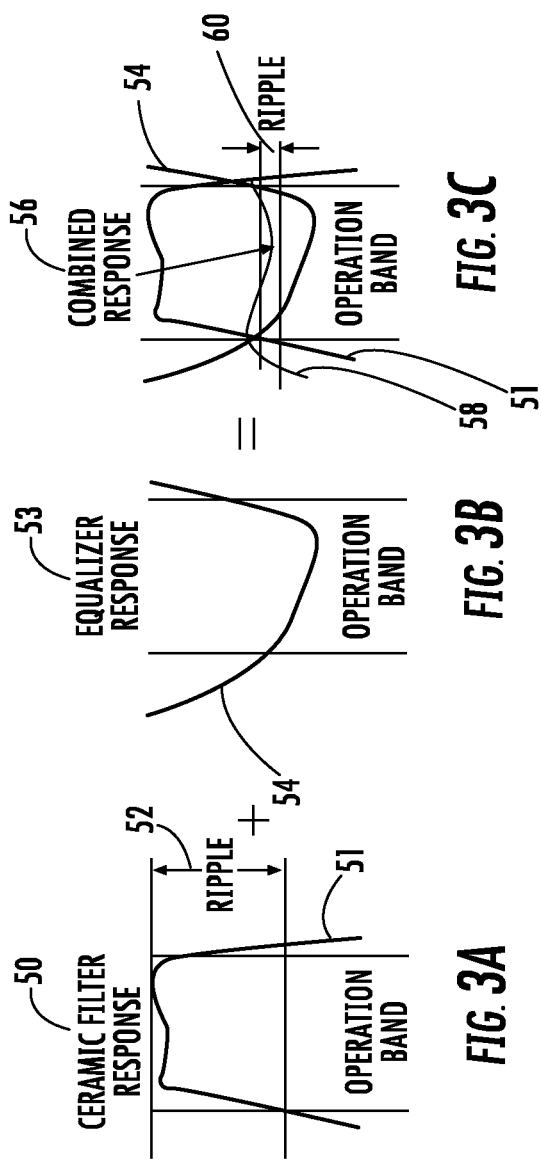
FIGS. 3A-3C are exemplary frequency response plots illustrating pass-band frequency responses of the RF filter in FIG. 2, the electronically tunable equalizer in FIG. 2, and a combination of the tunable equalizer and the RF filter in FIG. 2, respectively.

In this regard, FIGS. 3A and 3B are exemplary frequency response plots illustrating pass-band frequency responses in relation to the electronically tunable equalizer 34 and the RF filter 36 in FIG. 2. Specifically, FIG. 3A is an exemplary plot 50 of the filter response that is native to the RF filter 36. In FIG. 3A, the filter response 51 generated by the RF filter 36 has a relatively large ripple 52. FIG. 3B is an exemplary plot 53 of the equalizer response generated by the equalizer 34. The equalizer response 54 in FIG. 3B is generated by the equalizer 34 based on the configuration and operation of FIG. 2. When the electronically tunable capacitor circuit 40 is tuned among the plurality of capacitance states 44(1)-44(N), the shape and the magnitude of the equalizer response 54 in FIG. 3B changes accordingly.

With reference back to FIG. 2, the weighted pass-band frequency signal 48 generated by the electronically tunable equalizer 34 is provided to the RF filter 36. The RF filter 36 filters the weighted pass-band frequency signal 48 to generate a filtered pass-band frequency signal 49 with reduced ripple. The filtered pass-band frequency signal 49 has a frequency response ("combined response") that is a combination of the equalizer response and the filter response. Ideally, there should be smaller ripple in the filtered pass-band frequency signal 49, because the equalizer response acts to offset the ripple in the filter response. This is shown in FIG. 3C, which is an exemplary plot 56 of the combined response 58 of the filtered pass-band frequency signal 49. As can be seen in FIG. 3C, the equalizer response 58 helps smooth out an otherwise larger ripple 54 associated with the filter response 52, thus producing a much smaller ripple 60 in the combined response 58. Clearly, the equalizer response 58 generated by the electronically tunable equalizer 35 can effectively modify the filter response 52 generated by the RF filter 36, thus effecting the combined response 58 in the filtered pass-band frequency signal 49.

Figure 4:
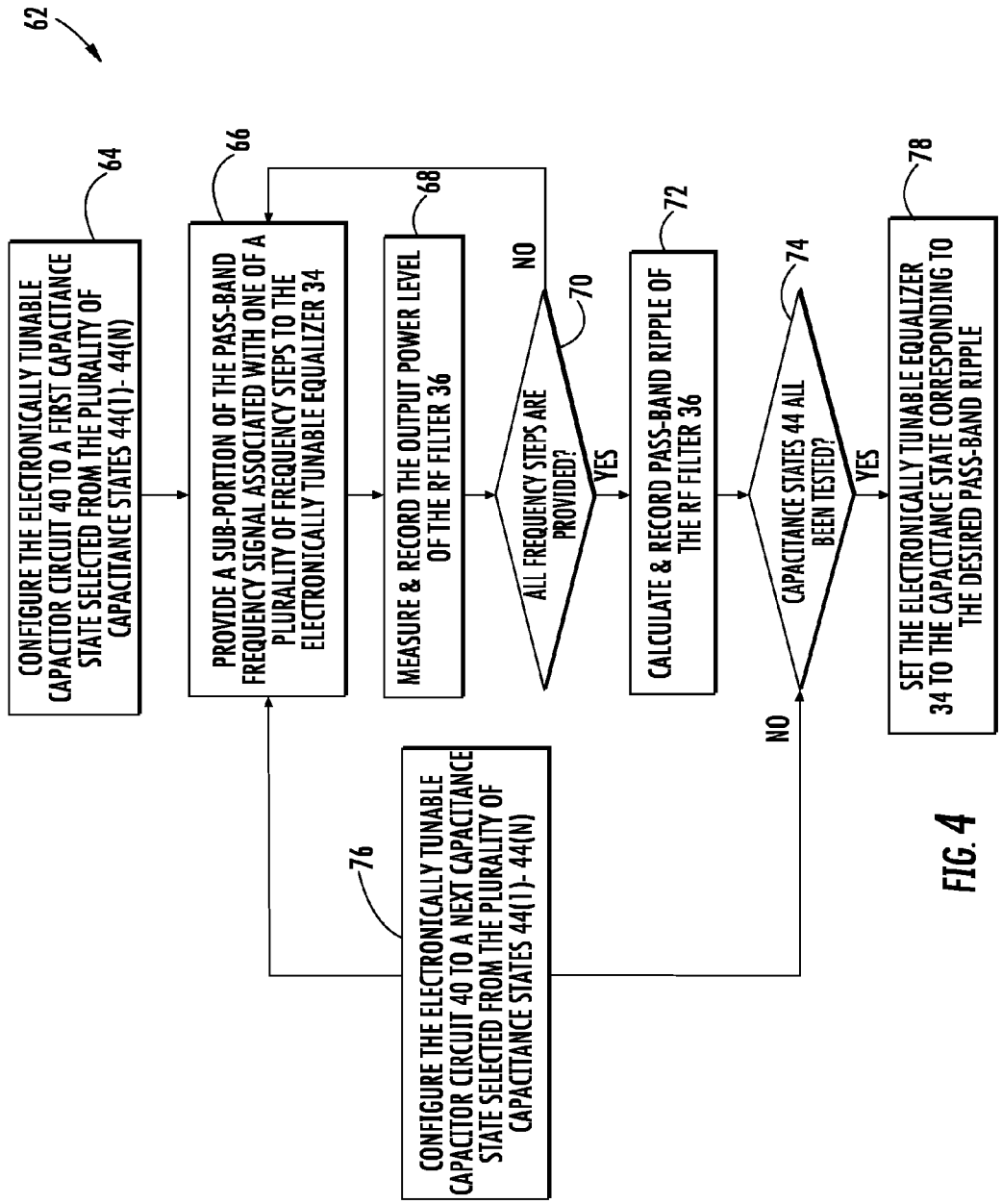
FIG. 4 is a flowchart illustrating an exemplary RF pass-band ripple tuning process for reducing pass-band ripple of the RF filter in the wireless communication unit in FIG. 2.

With continuing reference to FIG. 2, by having the electronically tunable equalizer 34 in the wireless communication unit 30, it is possible to configure the electronically tunable capacitor circuit 40 to a desired capacitance state among the plurality of capacitance states 44(1)-44(N) so that the wireless communication unit 30 will generate the filtered pass-band frequency signal 49 with a desired pass-band ripple, which is an aggregated effect of the electronically tunable equalizer 34 and the RF filter 36. However, it is understandably difficult for the RF pass-band ripple tuning controller 32 to pinpoint the desired capacitance state among the plurality of capacitance states 44(1)-44(N) without a proper process. In this regard, FIG. 4 is a flowchart illustrating an exemplary RF pass-band ripple tuning process 62 for the RF pass-band ripple tuning controller 32 to determine the desired capacitance state among the plurality of capacitance states 44(1)-44(N) for reducing the pass-band ripple in the wireless communication unit 30. As will be described in more detail below, the RF pass-band ripple tuning process 62 instructs the capacitance state selector 45 to select each of the plurality of capacitance states 44(1)-44(N) for the electronically tunable capacitor circuit 40. For each selection, the RF pass-band ripple tuning controller 32 measures the pass-band ripple of the wireless communication unit 30 influenced by all of the plurality of capacitance states 44(1)-44(N). The RF pass-band ripple tuning controller 32 can thus identify the desired capacitance state among the plurality of capacitance states 44(1)-44(N) that produces the desired pass-band ripple for the unit 30. In this regard, FIG. 4 will be discussed in conjunction with components of the RF pass-band ripple tuning system 28 of FIG. 2.

As shown in FIG. 4, the RF pass-band ripple tuning process 62 is a looped process designed to test the effect of each of the plurality of capacitance states 44(1)-44(N) on the pass-band ripple of the filtered pass-band frequency signal 49. The electronically tunable capacitor circuit 40 may be configured to have thirty-two (32) capacitance states indexed from 44(1) to 44(32) according to naming conventions used in FIG. 2, representing an exemplary capacitance range between 0.5 picofarad (pF) and 4.5 pF. The capacitance range is divided into thirty-one (31) incremental steps of one-hundred-twenty (120) femtofarad (fF). For example, capacitance state 31(1) represents a capacitance of 0.5 pF, capacitance state 31(2) represents a capacitance of 0.62 pF (0.5 pF plus 0.12 pF), and so on.

In this regard and with reference to FIG. 4, at the beginning of the RF pass-band ripple tuning process 60, the capacitance state selector 45 configures the electronically tunable capacitor circuit 40 to a first capacitance state among the plurality of capacitance states 44(1)-44(N) (block 64), for example capacitance state 44(1). Subsequently, the electronically tunable equalizer 34 is provided with a sub-portion of the pass-band frequency signal 38 associated with one of a plurality of frequency steps predetermined to divide the pass-band frequency signal 38 across a frequency range (e.g., bandwidth) into a plurality of sub-portions (block 66). For example, if a frequency signal has a frequency range between 2402 megahertz (MHz) and 2422 MHz as in Wi-Fi channel one (1) in the United States, and if the frequency range is divided into twenty (20) frequency steps, then each frequency step represents a 2 MHz sub-portion of the frequency signal. In this regard, when the electronically tunable equalizer 34 is said to be provided with a frequency step, the electronically tunable equalizer 34 is really provided with the sub-portion of the pass-band frequency signal 38 that corresponds to the frequency step. In a non-limiting example, the electronically tunable equalizer 34 is provided with a frequency step among the plurality of frequency steps from the lowest frequency step to the highest frequency step.

When the sub-portion of the pass-band frequency signal 38 is provided to the electronically tunable equalizer 34 and in turn the RF filter 36, the RF pass-band ripple tuning controller 32 can measure and record an output power level of the wireless communication unit 30 corresponding to the sub-portion of the pass-band frequency signal 38 (block 68). The RF pass-band ripple tuning process 62 repeats the step of providing the next frequency step to the electronically tunable equalizer 34 (block 66), and the step of measuring and recording a corresponding output power level of the RF filter 36 (block 68) until each of the plurality of frequency steps has been provided to the electronically tunable equalizer 34, and the corresponding output power level of the RF filter 36 are measured and recorded (block 70). At this point, the RF pass-band ripple tuning controller 32 calculates and records a pass-band ripple for the current capacitance state (block 72). In a non-limiting example, the pass-band ripple is calculated as the ratio (dB) of the highest recorded output power level of the RF filter 36 and the lowest recorded output power level of the RF filter 36. If some of the capacitance states 44(1)-44(N) remain to be tested (block 74), the electronically tunable capacitor circuit 40 is then configured to a next capacitance state among the plurality of capacitance state 44(1)-44(N) (block 76) and so repeated until all of the plurality of capacitance states 44(1)-44(N) are tested. At this point, the RF pass-band ripple tuning controller 32 has measured and recorded the pass-band ripple associated with all of the plurality of capacitance states 44(1)-44(N). The RF pass-band ripple tuning controller 42 is thus able to identify a desired pass-band ripple among all recorded pass-band ripples and instructs the capacitance state selector 45 to configure the electronically tunable equalizer 34 to the capacitance state associated with the desired pass-band ripple (block 78). At completion of the RF pass-band ripple tuning process 62, the equalizer 34 is thus tuned to produce the desired pass-band ripple in the filtered pass-band frequency signal 49.

With continuing reference to FIG. 4, the step of configuring the capacitor circuit 40 to a next capacitance state (block 76) can be carried out in many possible ways. In a non-limiting example, selection of the next capacitance state may be in sequential ascending order. For example, the electronically tunable capacitor circuit 40 is set to the next capacitance state such as 44(2), 44(3), and so on. By the same example, if the electronically tunable capacitor circuit 40 has been configured up to capacitance state of 44(N), the RF pass-band ripple tuning process 62 will come to an end since capacitance state 44(N) is the highest order among the plurality of capacitance state 44(1)-44(N). In another non-limiting example, the electronically tunable capacitor circuit 40 may be configured to start with any of the plurality of capacitance states 44(1)-44(N) and select a next capacitance state in sequential descending, random, or other order. It is also possible for the RF pass-band ripple tuning controller 32 to stop the RF pass-band ripple tuning process 62 after testing only a subset of the plurality of capacitance states 44(1)-44(N) as long as a desired pass-band ripple measure is obtained. Further, the RF pass-band ripple tuning process 62 may be performed while the wireless communication unit 32 is off-line (e.g., during testing, calibration, maintenance) or online (e.g., during real-time operation). Further, the RF pass-band ripple tuning controller 32 may be a self-contained entity (e.g., automatic test equipment) outside the wireless communication unit 32 or be integrated as part of the unit 32.

Figure 5A:
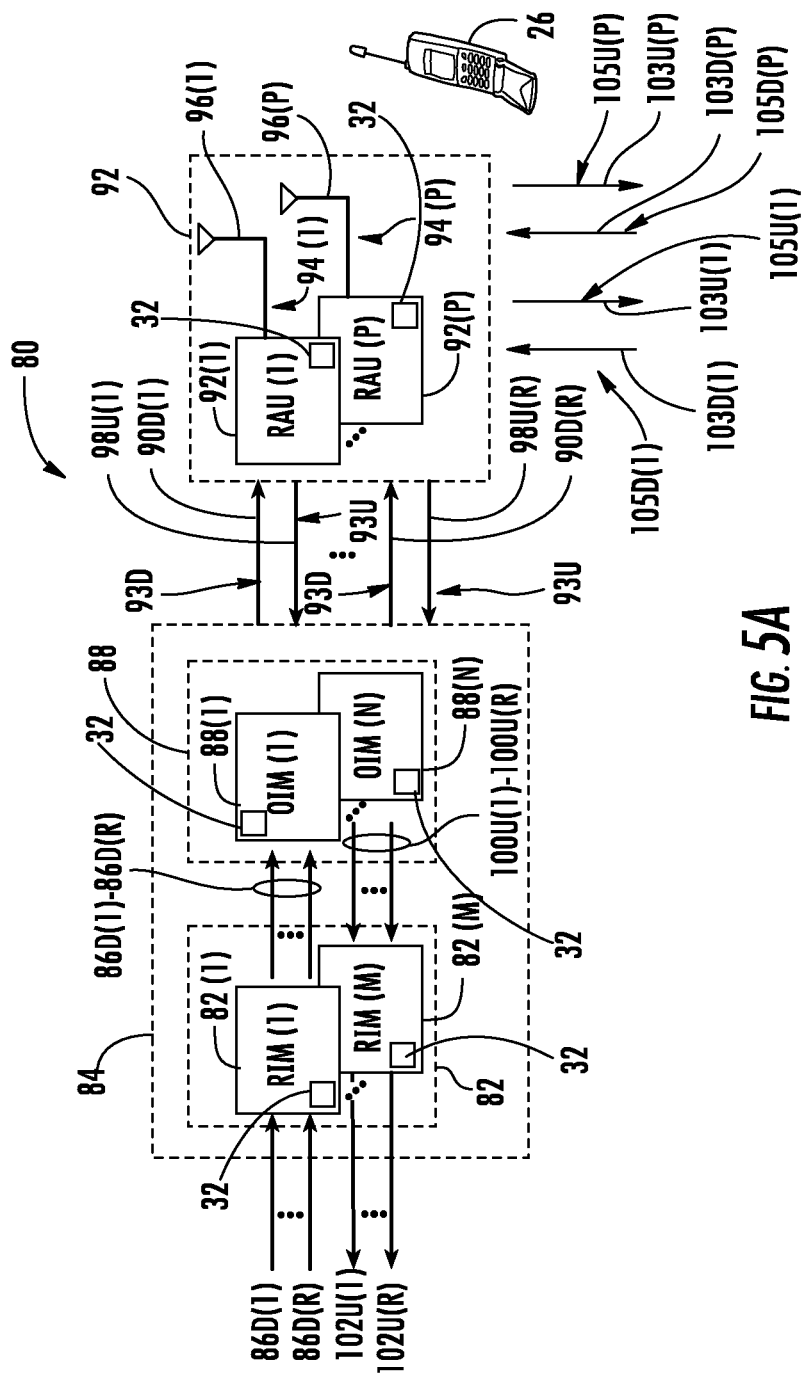
FIGS. 5A and 5B are schematic diagrams illustrating an exemplary optical fiber-based DAS that can include the electronically tunable equalizer components in which the RF pass-band ripple tuning controller in FIG. 2 can be included.

In this regard, FIG. 5A is a schematic diagram of another exemplary optical fiber-based distributed antenna system (DAS) 80 as an example of the wireless communication unit 32 that may include the RF pass-band ripple tuning controller 32 in FIG. 2 for reducing pass-band ripple in RF filters used for pass-band filtering in the DAS 80. In this embodiment, the optical fiber-based DAS 80 includes optical fiber for distributing RF communication services. The optical fiber-based DAS 80 in this embodiment is comprised of three (3) main components. One or more radio interfaces provided in the form of radio interface modules (RIMs) 82(1)-82(M) in this embodiment are provided in head end equipment (HEE) 84 to receive and process downlink electrical RF communications signals 86D(1)-86D(R) from one or more base stations 87(1)-87(T) (shown in FIG. 5B) prior to optical conversion into downlink optical RF communications signals. The RIMs 82(1)-82(M) provide both downlink and uplink interfaces. The notations "1-R" and "1-M" indicate that any number of the referenced component, 1-R and 1-M, respectively, may be provided. The RF pass-band ripple tuning controller 32 in FIG. 2 can be included in the RIMs 82(1)-82(M) or provided in the same location, housing, or packaging as the RIMs 82(1)-82(M), for reducing pass-band ripple in RF filters used for pass-band filtering in the RIMs 82(1)-82(M). As will be described in more detail below, the HEE 84 is configured to accept a plurality of RIMs 82(1)-82(M) as modular components that can easily be installed and removed or replaced in the HEE 84. In one embodiment, the HEE 84 is configured to support up to eight (8) RIMs 82(1)-82(8).

Each RIM 82(1)-82(M) can be designed to support a particular type of radio source or range of radio sources (i.e., frequencies) to provide flexibility in configuring the HEE 84 and the optical fiber-based DAS 80 to support the desired radio sources. For example, one RIM 82 may be configured to support the PCS radio band. Another RIM 82 may be configured to support the 700 MHz radio band. In this example, by inclusion of these RIMs 82, the HEE 84 would be configured to support and distribute RF communications signals on both PCS and LTE 700 radio bands. RIMs 82 may be provided in the HEE 84 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 82 may be provided in the HEE 84 that support any wireless technologies desired, including but not limited to Code Division Multiple Access (CDMA), CDMA200, 1 xRTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

RIMs 82 may be provided in the HEE 84 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF signals 86D(1)-86D(R) are provided to a plurality of optical interfaces provided in the form of optical interface modules (OIMs) 88(1)-88(N) in this embodiment to convert the downlink electrical RF signals 86D(1)-86D(N) into downlink optical RF communications signals 90D(1)-90D(R). The RF pass-band ripple tuning controller 32 in FIG. 2 can also be included in the OIMs 88(1)-88(N), or provided in the same location, housing, or packaging as the OIMs 88(1)-88(N), for reducing pass-band ripple in RF filters used for pass-band filtering in the OIMs 88(1)-88(N). The notation "1-N" indicates that any number of the referenced component 1-N may be provided. The OIMs 88 may be configured to provide one or more optical interface components (OICs) that contain O/E and E/O converters, as will be described in more detail below. The OIMs 88 support the radio bands that can be provided by the RIMs 82, including the examples previously described above. Thus, in this embodiment, the OIMs 88 may support a radio band range from 400 MHz to 2700 MHz, as an example, so providing different types or models of OIMs 88 for narrower radio bands to support possibilities for different radio band-supported RIMs 82 provided in the HEE 84 is not required. Further, as an example, the OIMs 88 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 88(1)-88(N) each include E/O converters to convert the downlink electrical RF communications signals 86D(1)-86D(R) to downlink optical RF communications signals 90D(1)-90D(R). The downlink optical RF communications signals 90D(1)-90D(R) are communicated over downlink optical fiber(s) 93D to a plurality of remote units provided in the form of remote antenna units (RAUs) 92(1)-92(P). The notation "1-P" indicates that any number of the referenced component 1-P may be provided. O/E converters provided in the RAUs 92(1)-92(P) convert the downlink optical RF communications signals 90D(1)-90D(R) back into downlink electrical RF communications signals 86D(1)-86D(R), which are provided over downlinks 94(1)-94(P) coupled to antennas 96(1)-96(P) in the RAUs 92(1)-92(P) to client devices 26 in the reception range of the antennas 96(1)-96(P). The RF pass-band ripple tuning controller 32 in FIG. 2 can also be included in the RAUs 92(1)-92(P), or provided in the same location, housing, or packaging as the RAUs 92(1)-92(P), for reducing pass-band ripple in RF filters used for pass-band filtering in the RAUs.

Figure 5B:
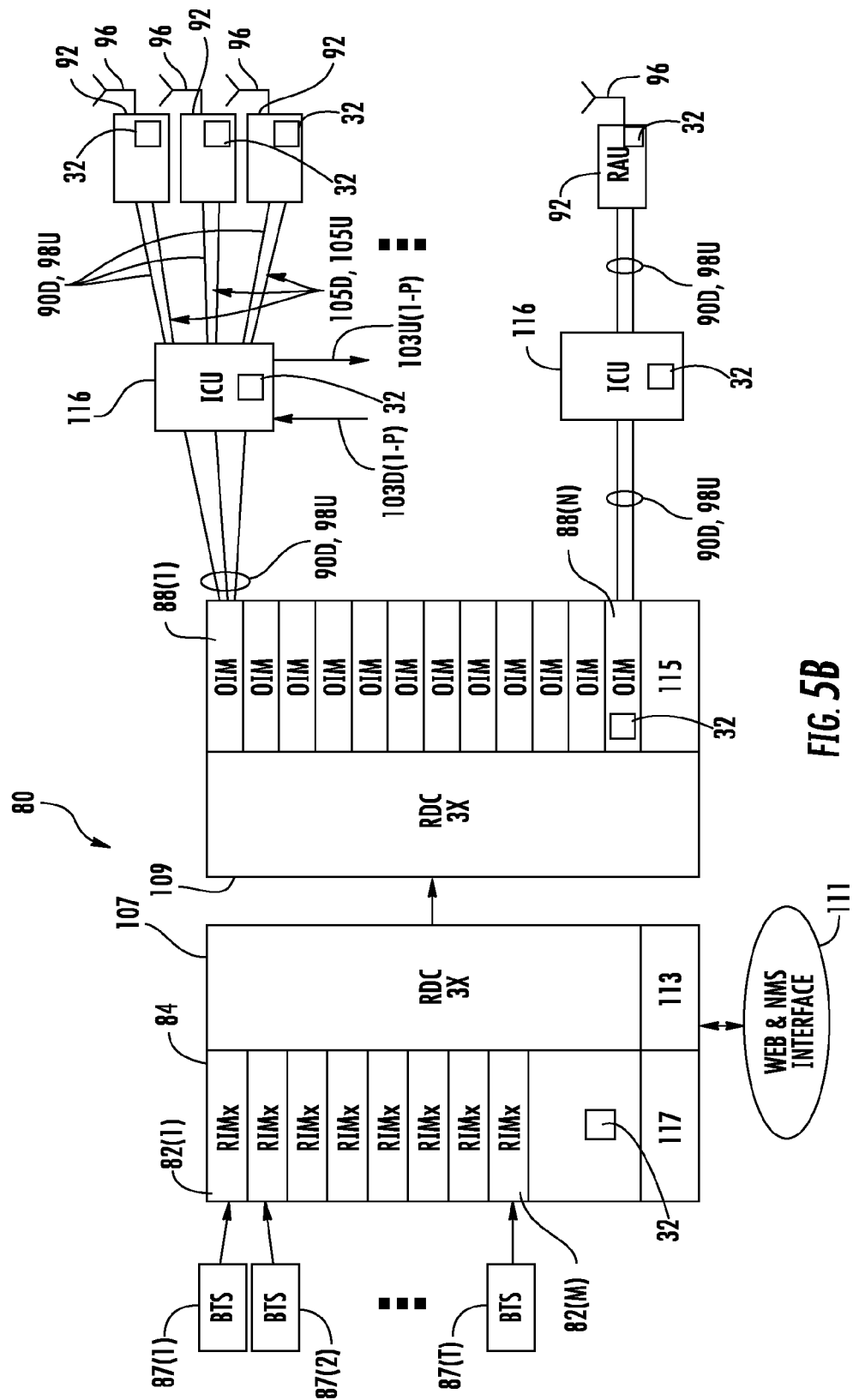

E/O converters are also provided in the RAUs 92(1)-92(P) to convert uplink electrical RF communications signals received from client devices 26 through the antennas 96(1)-96(P) into uplink optical RF communications signals 98U(1)-98U(R) to be communicated over uplink optical fibers 93U to the OIMs 88(1)-88(N). The OIMs 88(1)-88(N) include O/E converters that convert the uplink optical RF communications signals 98U(1)-98U(R) into uplink electrical RF communications signals 100U(1)-100U(R) that are processed by the RIMs 82(1)-82(M) and provided as uplink electrical RF communications signals 102U(1)-102U(R). Downlink electrical digital signals 103D(1)-103D(P), such as Ethernet signals, communicated over downlink electrical medium or media (hereinafter "medium") 105D(1)-105D(P) can be provided to the RAUs 92(1)-92(P), such as from a digital data services (DDS) controller and/or DDS switch as provided by example in FIG. 5B, separately from the RF communication services, as well as uplink electrical digital signals 103U(1)-103U(P) communicated over uplink electrical medium 105U(1)-105U(P), as also illustrated in FIG. 5B. Common elements between FIGS. 5A and 5B are illustrated in FIG. 5B with common element numbers. Power may be provided in the downlink and/or uplink electrical medium 105D(1)-105D(P) and/or 105U(1)-105U(P) to the RAUs.

FIG. 5B is a schematic diagram of providing digital data services and RF communication services to RAUs and/or other remote communications units in the optical fiber-based DAS 80 of FIG. 5A. Common components between FIGS. 5A and 5B have the same element numbers and thus will not be re-described. As illustrated in FIG. 5B, a power supply module (PSM) 113 may be provided to provide power to the RIMs 82(1)-82(M) and radio distribution cards (RDCs) 107 that distribute the RF communications from the RIMs 82(1)-82(M) to the OIMs 88(1)-88(N) through RDCs 109. In one embodiment, the RDCs 107, 109 can support different sectorization needs. A PSM 115 may also be provided to provide power the OIMs 88(1)-88(N). An interface 111, which may include web and network management system (NMS) interfaces, may also be provided to allow configuration and communication to the RIMs 82(1)-82(M) and other components of the optical fiber-based DAS 80. A microcontroller, microprocessor, or other control circuitry, called a head-end controller (HEC) 117 may be included in HEE 84 to provide control operations for the HEE 84. The RF pass-band ripple tuning controller 32 in FIG. 2 may also be incorporated into or associated with one or more interconnect units (ICUs) 116, as shown in FIG. 5B, for reducing pass-band ripple in RF filters used for pass-band filtering in the ICUs 116 provide power signals to the RAUs 92(1)-92(P) or route information about other monitored signals to other components in the DAS 80.

Figure 6:
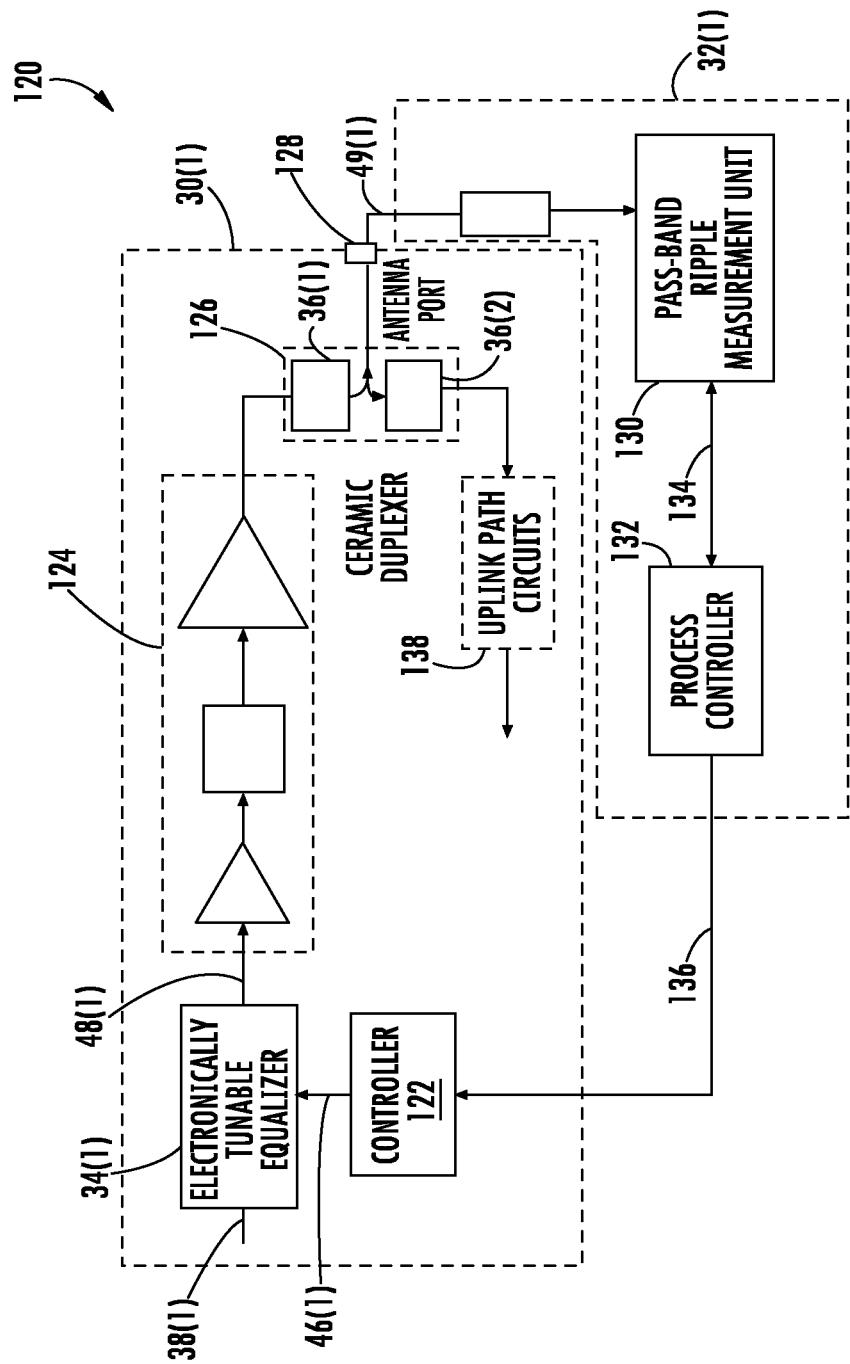
FIG. 6 is a schematic diagram of a more detailed configuration of the exemplary elements that can be employed in the RF pass-band ripple tuning system in FIG. 2.

FIG. 6 is a more detailed schematic diagram illustrating an exemplary RF pass-band ripple tuning system 120 that includes an electronically tunable equalizer 34(1) provided in a wireless communication unit 30(1) and controlled by a RF pass-band ripple tuning controller 32(1) for reducing pass-band ripple in the wireless communication unit 30(1). Elements of FIG. 2 are referenced in connection with FIG. 6 and will not be re-described herein. According to one embodiment designed to perform RF pass-band ripple tuning on a DL path in a DAS remote unit, the exemplary RF pass-band ripple tuning system 120 comprises the wireless communication unit 30(1) ("DAS RU") and a RF pass-band ripple tuning controller 32(1), which may be a self-contained automatic test equipment (ATE). The DAS RU 30(1) comprises an electronically tunable equalizer 34(1) coupled with a controller 122. The DAS RU 30(1) further comprises a DL processing unit 124, a ceramic duplexer 126, and an antenna port 128. The ceramic duplexer 126 comprises a DL ceramic filter 36(1) configured to pass a DL pass-band frequency signal and block a UL pass-band frequency signal. Hence on the DL path, the pass-band frequency signal 38(1) will propagate through the electronically tunable equalizer 34(1), the DL processing unit 124, and the DL ceramic filter 36(1) before arriving at the antenna port 128. According to the embodiment, the electronically tunable equalizer 34(1) receives the pass-band frequency signal 38(1) from a RF signal generator (not shown) and generates a weighted pass-band frequency signal 48(1). The DL ceramic filter 36(1) receives the weighted pass-band frequency signal 48(1) and generates a filtered pass-band frequency signal 49(1), which can be received at the antenna port 128.

With reference to FIG. 6, the RF pass-band ripple tuning controller 32(1) comprises a pass-band ripple measurement unit 130 and a process controller 132. In a non-limiting example, the pass-band ripple measurement unit 130 and the process controller 132 may be integrated into a single entity, which may be enabled by hardware, software, or combination of both. The pass-band ripple measurement unit 130 is coupled to the antenna port 128 and measures the pass-band ripple in the filtered pass-band frequency signal 49(1). The process controller 132 is configured to receive a ripple measurement output 134 from the pass-band ripple measurement unit 130 and compare the pass-band ripple in the ripple measurement output 134 to a predefined ripple performance threshold. If the ripple is greater than the predefined pass-band ripple threshold, the process controller 132 is configured to generate a ripple tuning instruction 136 to the controller 122. In another non-limiting example, the process controller 132 and the controller 122 may be integrated into the same entity. In response to receiving the ripple tuning instruction 136, the controller 122 configures the electronically tunable equalizer 34(1) to a first capacitance state among the plurality of capacitance states 44(1)-44(N) by sending the capacitance state input 46(1) to the electronically tunable equalizer 34(1). The controller 122 is configured to repeatedly configure the electronically tunable equalizer 34(1) to a next capacitance state among the plurality of capacitance states 44(1)-44(N) until all of the plurality of capacitance states 44(1)-44(N) are tested. For each of the plurality of capacitance state 44(1)-44(N), a corresponding filtered pass-band frequency signal 49(1) is generated by the wireless communication unit 30(1) and received by the pass-band ripple measurement unit 130 via the antenna port 128. The pass-band ripple measurement unit 130 measures the pass-band ripple in the filtered pass-band frequency signal 49(1) and provides the pass-band ripple to the process controller 132 in the ripple measurement report 134. After the controller 122 has configured the electronically tunable equalizer 34(1) to all of the plurality of capacitance states 44(1)-44(N), the process controller 132 is able to identify a desired pass-band ripple among all pass-band ripple measurements received from the pass-band ripple measurement unit 130. The process controller 132 can then instruct the controller 122 to configure the electronically tunable equalizer 34(1) to the capacitance state associated with the desired pass-band ripple for desired pass-band ripple performance in the DAS RU 30(1).

With continuing reference to FIG. 6, the DAS RU 30(1) further comprises a UL digital processing unit 138 coupled to a UL ceramic filter 36(2) in the ceramic duplexer 126. The UL ceramic filter 36(2) is coupled to the antenna port 128 and configured to pass a UL pass-band frequency signal and block a DL pass-band frequency signal. By the UL ceramic filter 36(2) receiving a UL pass-band frequency signal (not shown) from the antenna port 128 and providing the UL pass-band frequency signal (not shown) to the UL digital processing unit 138, the exemplary RF pass-band ripple tuning system 120 can be configured to perform the RF pass-band ripple tuning process on a UL path of the DAS RU 30(1).

Figure 7:
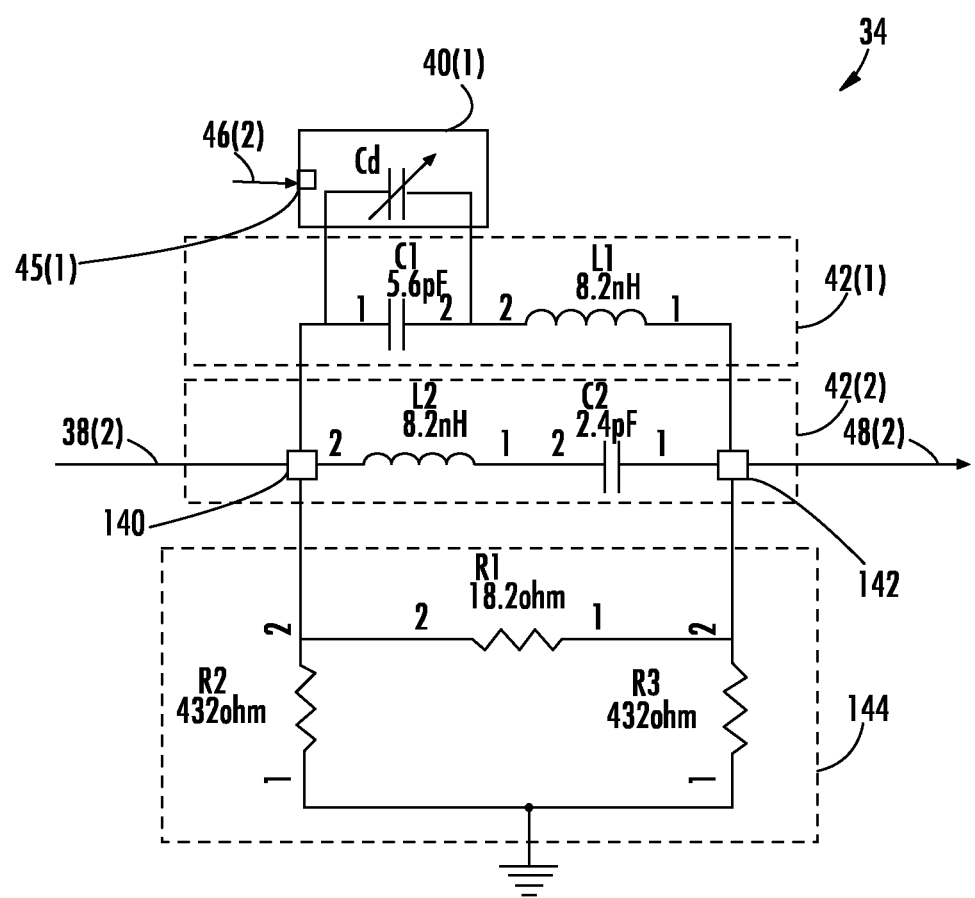
FIG. 7 is a schematic diagram of an exemplary electronically tunable equalizer configured to select a capacitance state among a plurality of capacitance states.

To help explain how the electronically tunable equalizer 34 in FIG. 2 is able to modify the equalizer response in the weighted pass-band frequency signal 48 in FIG. 2, FIG. 7 is provided. FIG. 7 is a schematic diagram of an exemplary electronically tunable equalizer 34 that can be configured to select a capacitance state among the plurality of capacitance states 44(1)-44(N), causing the exemplary electronically tunable equalizer 34 to change the equalized response of the weighted pass-band frequency signal 48. The electronically tunable equalizer 34 comprises a pass-band RF signal input 140 configured to receive the pass-band frequency signal 38(2) and a pass-band RF signal output 142 configured to output the weighted pass-band frequency signal 48(2). The electronically tunable equalizer 34 further comprises a first resonator 42(1) and a second resonator 42(2), both coupled to the pass-band RF signal input 140 and the pass-band RF signal output 142. According to one embodiment of design, the first resonator 42(1) comprises a capacitor C1 and an inductor L1, the second resonator 42(2) comprises a capacitor C2 and an inductor L2. In a non-limiting example, the capacitor C1 has a capacitance of 5.6 pF, the first inductor has an inductance of 8.2 nanohenry (nH), the second capacitor C2 has a capacitance of 2.4 pF, and the second inductor has an inductance of 8.2 nH. Therefore, the first resonator 42(1) and the second resonator 42(2) are generating a first resonance frequency F1 (not shown) and a second resonance frequency F2 (not shown), respectively. A resonance frequency is a frequency of electrical oscillation determined by the physical parameters (e.g., capacitor C1, C2 and inductor L1, L2) of the first resonator 42(1) and the second resonator 42(2), respectively. The first resonance frequency F1 and the second resonance frequency F2 are determined as $F1=1/(2\pi\sqrt{(L1 \cdot C1)})$ and $F2=1/(2\pi\sqrt{(L2 \cdot C2)})$, respectively. The first resonance frequency F1 and the second resonance frequency F2 are combined at the pass-band RF signal output 142, thus generating the weighted pass-band frequency signal 48(2). As long as the capacitance C1 and the inductance L1 remain constant in the first resonator 42(1), the corresponding resonance frequency F1 will not change. Same is true for the second resonance frequency F2 generated by the second resonator 42(2). As a result, the equalizer response of the weighted pass-band frequency 48(2) is static for the pass-band frequency signal 38(2).

Figure 8:
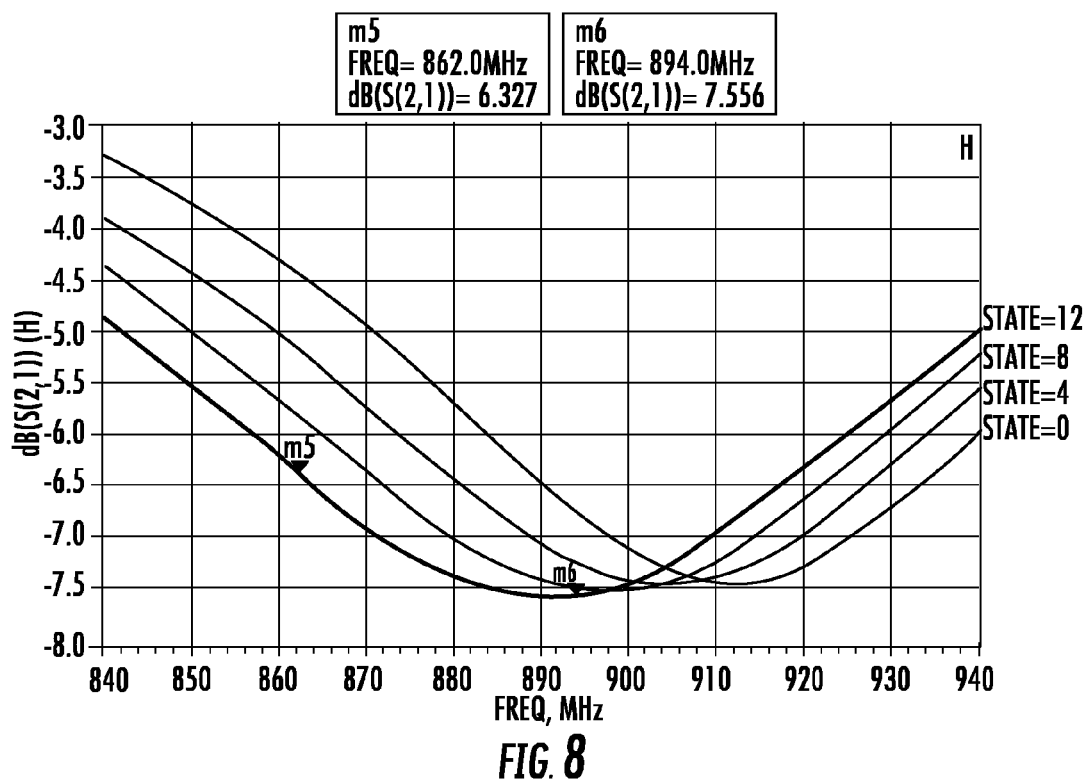
FIG. 8 illustrates exemplary plots of equalizer responses corresponding to a plurality of lower-numbered capacitance states of the capacitor circuit in FIG. 7.
Figure 9:
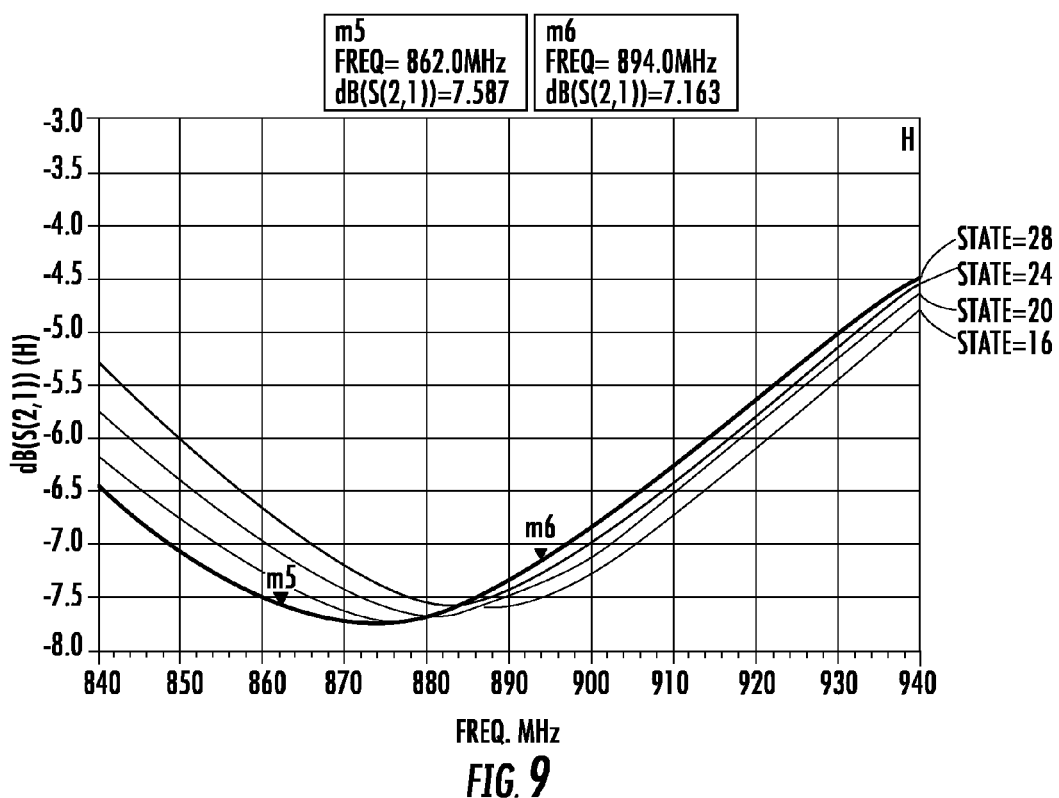
FIG. 9 illustrates exemplary plots of equalizer responses corresponding to a plurality of higher-numbered capacitance states of the capacitor circuit in FIG. 7.

With reference to FIG. 7, the electronically tunable equalizer 34 further comprises an electronically tunable capacitor circuit 40(1) coupled in parallel to the capacitor C1 in the first resonator 42(1). The electronically tunable capacitor circuit 40(1) comprises a capacitance state selector 45(1), a plurality of capacitance states 44(1)-44(N), and a tunable capacitor Cd. Each of the plurality of capacitance states 44(1)-44(N) correspond to a specific capacitance of the tunable capacitor Cd. In another non-limiting example, the tunable capacitor Cd has a tunable capacitance range between 0.5 pF and 4.5 pF that is divided into thirty-two (32) frequency states separated by a capacitance step of 0.12 pF. The capacitance state selector 45(1) configures the capacitor Cd to one of the plurality of capacitance states 44(1)-44(N) based on the capacitance state input 46(2). According to well established theorem, the capacitance is (C1+Cd) when the capacitor C1 is coupled in parallel with the capacitor Cd. As result, the first resonator 42(1) generates a modified first resonance frequency $F1_M$ (not shown) that can be expressed as $F1_M=1/[2\pi\sqrt{(L1 \cdot (C1+Cd))}]$. In this regard, the modified first resonator frequency $F1_M$ becomes tunable by tuning the capacitor Cd among the plurality of capacitance state 44(1)-44(N). As a non-limiting example, the modified first resonator frequency $F1_M$ has a tunable frequency range between 533 MHz and 712 MHz when capacitor Cd is tuned between 0.5 pF and 4.5 pF. The second resonance frequency F2 is approximately fixed at 1134 MHz since it is largely not affected by the capacitor Cd in the electronically tunable capacitor circuit 40(1). Further, the equalizer response of the weighted pass-band frequency signal 48(2) also becomes tunable based on the plurality of capacitance states 44(1)-44(N) because the weighted pass-band frequency signal 48(2) is a dependent of the modified first resonance frequency $F1_M$ and the second resonance frequency F2. With continuing reference to FIG. 7, the electronically tunable equalizer 34 further comprises an attenuator 144 coupled across the pass-band RF signal input 140 and the pass-band RF signal output 142. The attenuator 144 is configured to work with the resonators 42(1), 42(2) to produce the weighted pass-band frequency signal 48(2). To help illustrate how the plurality of capacitance states 44(1)-44(N) in the electronically tunable capacitor circuit 40(1) effect the equalizer response of the electronically tunable equalizer 34, FIG. 8 and FIG. 9 are provided and discussed next. Elements of FIG. 7 are referenced in connection with FIG. 8 and FIG. 9, and will not be re-described herein.

FIG. 8 illustrates plots of different equalizer responses associated with a plurality of lower capacitance states of the electronically tunable capacitor circuit 40(1) (shown in FIG. 7). The plots in FIG. 8 correspond to the equalizer responses of the electronically tunable equalizer 34 at capacitance states zero (0), four (4), eight (8), and twelve (12), respectively. The distance between points m5 and m6 on the vertical axis represents the amount of pass-band ripple reduction, measured in dB, that can be achieved by the corresponding capacitance state between the related frequencies of points m5 and m6. Take the plot of capacitance state twelve (12) as an example, the vertical distance between points m5 and m6 indicates that the electronically tunable equalizer 34, when tuned to capacitance state twelve (12), is able to provide approximately 1.3 dB (approximately calculated as: negative 6.3 dB at m5 minus negative 7.6 dB at m6) pass-band ripple reduction in the 862 MHz to 894 MHz pass-band frequency range. Plots of other capacitance states in FIG. 8 can be interpreted according to the same principles as described for capacitance state twelve (12).

In this regard, FIG. 9 illustrates exemplary plots of different equalizer responses associated with a plurality of upper capacitance states of the electronically tunable capacitor circuit 40(1) (shown in FIG. 7). Taking the plot of capacitance state twenty-eight (28) as an example, the vertical distance between points m5 and m6 indicates that the electronically tunable equalizer 34, when tuned to capacitance state twenty-eight (28), is able to provide approximately −0.4 dB pass-band ripple reduction in the 862 MHz to 894 MHz frequency range. Clearly, capacitance state twelve (12) provides a higher pass-band ripple reduction than capacitance state twenty-eight (28) in the 860 MHz to 900 MHz frequency range. The amount of the required ripple reduction and its location along the pass-band depend on the ripple of the ceramic filter that is equalized.

Figure 10:
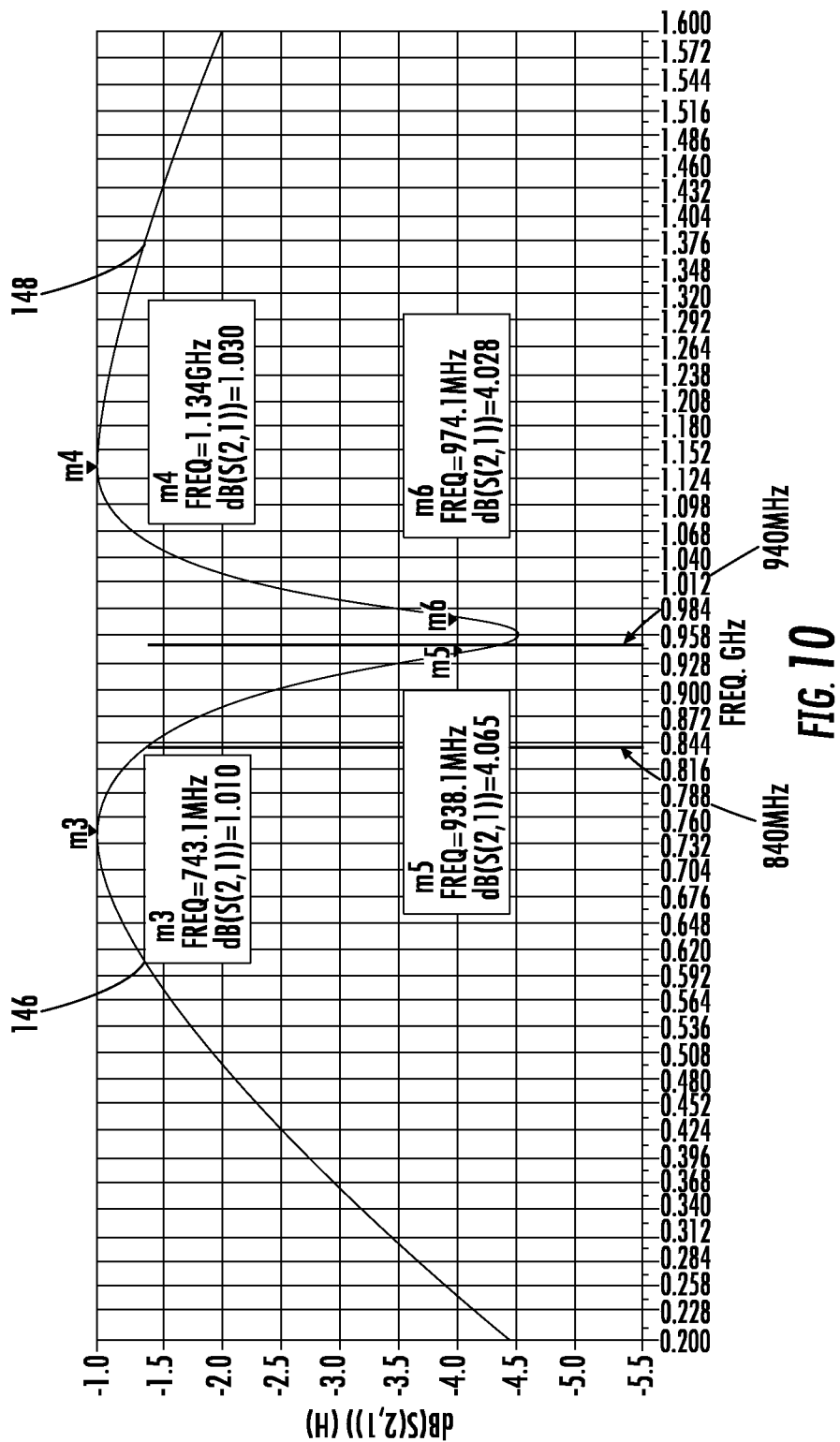
FIG. 10 is a plot of an overall frequency response of the equalizer in FIG. 7.

In this regard, FIG. 10 is an exemplary plot of an overall frequency response of the electronically tunable equalizer 34(1) in FIG. 6 with an exemplary pass-band ripple equalization of approximately 3 dB in a pass-band frequency between 840 MHz and 940 MHz (−1.4 dB at 840 MHz to −4.4 dB at 940 MHz). Elements of FIG. 6 and FIG. 7 are referenced in connection with FIG. 10 and will not be re-described herein. As described earlier in FIG. 7, the equalizer response of the electronically tunable equalizer 34 is a combined result of the modified first resonator frequency $F1_m$ and the second resonator frequency F2. The modified first resonator frequency $F1_m$ is modified by the tunable capacitor Cd among the plurality of capacitance states 44(1)-44(N) in the electronically tunable capacitor circuit 40(1). Point m3 represents the modified first resonator frequency, which is tunable between 533 MHz and 745 MHz according to the example in FIG. 7. The plotted curve 148 and point m4 represent the second resonator frequency that is fixed at 1134 MHz according to the example in FIG. 7.

Figure 11:
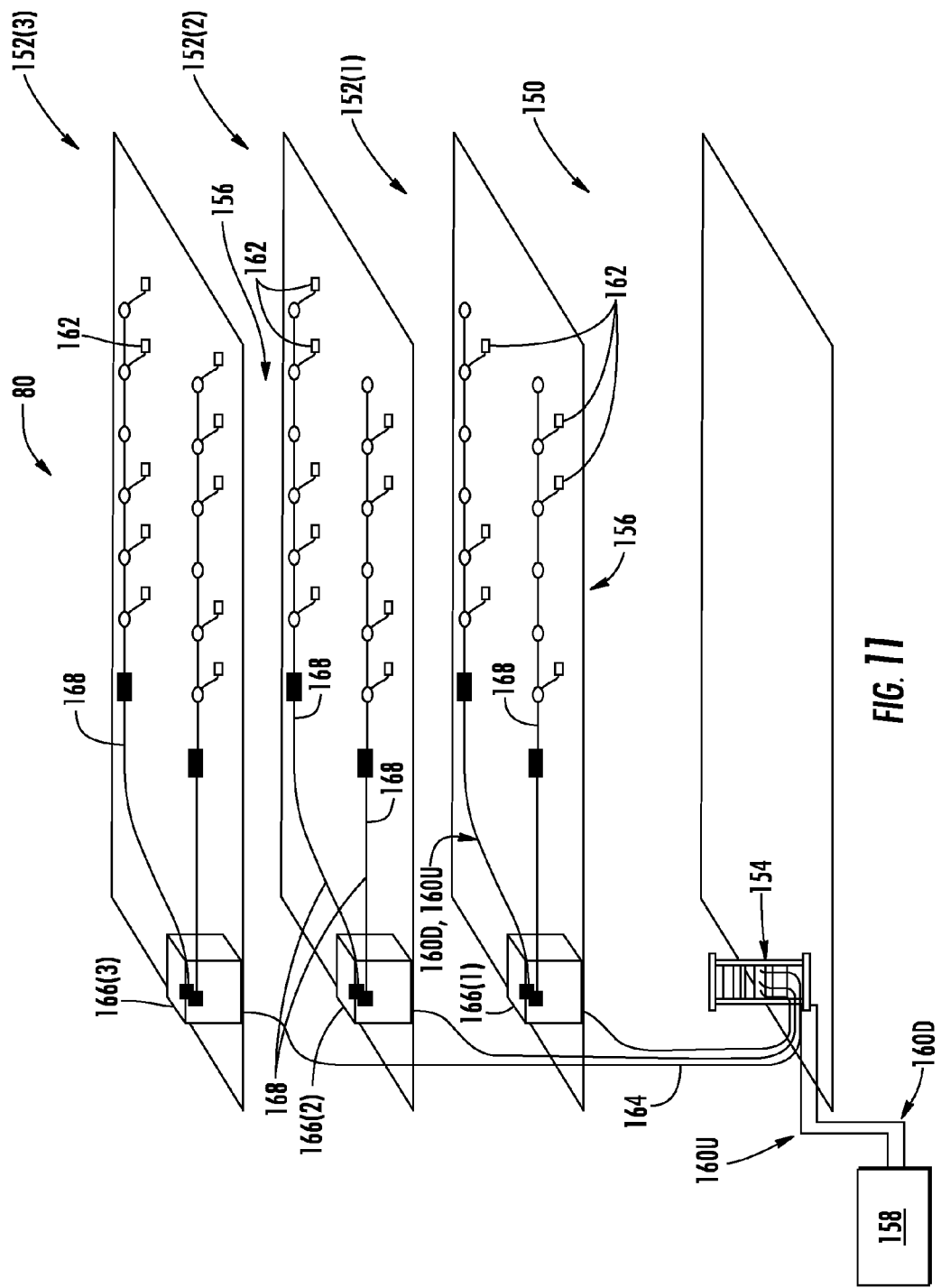
FIG. 11 is a partially schematic cut-away diagram of a building infrastructure in which the RF pass-band ripple tuning system in FIGS. 2 and 6 can be employed.

The DAS 80 in FIG. 5A and FIG. 5B may also be provided in an indoor environment, as illustrated in FIG. 11. FIG. 11 is a partially schematic cut-away diagram of a building infrastructure 150 employing the DASs 80 described herein. The building infrastructure 150 in this embodiment includes a first (ground) floor 152(1), a second floor 152(2), and a third floor 152(3). The floors 152(1)-152(3) are serviced by the central unit 154 to provide the antenna coverage areas 156 in the building infrastructure 150. The central unit 154 is communicatively coupled to the base station 158 to receive downlink communications signals 160D from the base station 158. The central unit 154 is communicatively coupled to the remote antenna units 162 to receive the uplink communications signals 160U from the remote antenna units 162, as previously discussed above. The downlink and uplink communications signals 160D, 160U communicated between the central unit 154 and the remote antenna units 162 are carried over a riser cable 164. The riser cable 164 may be routed through interconnect units (ICUs) 166(1)-166(3) dedicated to each floor 152(1)-152(3) that route the downlink and uplink communications signals 160D, 160U to the remote antenna units 162 and also provide power to the remote antenna units 162 via array cables 168.

Figure 12:
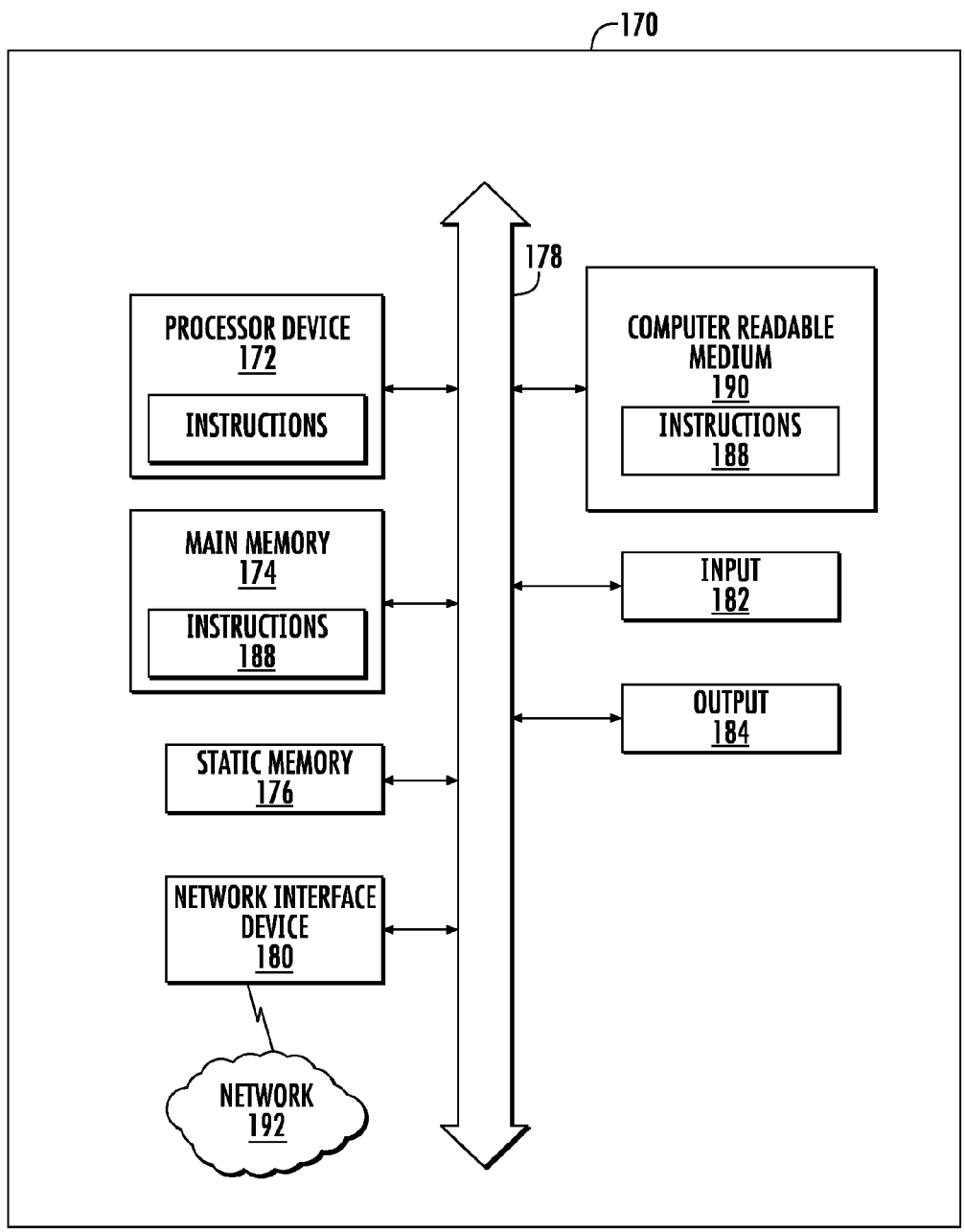
FIG. 12 is a schematic diagram of a generalized representation of an exemplary controller that can be included in a RF pass-band ripple tuning system, a central unit, remote units, wireless client devices, and/or any other component of a WDS to reduce pass-band ripple of a RF filter in FIG. 4.

FIG. 12 is a schematic diagram representation of additional detail illustrating a computer system 170 that could be employed in a RF pass-band ripple tuning system, including as the RF pass-band ripple tuning controller 32, the controller 122, and the process controller 132 in the RF pass-band ripple tuning system 28, 120 in FIGS. 2 and 7, respectively, to reduce pass-band ripple in RF filters used for pass-band filtering in a wireless communication unit 32 ("DAS unit"). The control system 170 is adapted to execute instructions from an exemplary computer-readable medium to perform these and/or any of the functions or processing described herein.

In this regard, the computer system 170 in FIG. 12 may include a set of instructions that may be executed to calculate pass-band ripple of DAS unit in a DAS and instruct the DAS unit to initiate RF filter pass-band ripple reduction process. The computer system 170 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 170 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 170 in this embodiment includes a processing device or processor 172, a main memory 174 (e.g., read-only memory (ROM), flash memory, dynamic random access memory (DRAM), such as synchronous DRAM (SDRAM), etc.), and a static memory 176 (e.g., flash memory, static random access memory (SRAM), etc.), which may communicate with each other via a data bus 178. Alternatively, the processor 172 may be connected to the main memory 174 and/or static memory 176 directly or via some other connectivity means. The processor 172 may be a controller, and the main memory 174 or static memory 176 may be any type of memory.

The processor 172 represents one or more general-purpose processing devices, such as a microprocessor, central processing unit, or the like. More particularly, the processor 172 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 172 is configured to execute processing logic in instructions for performing the operations and steps discussed herein.

The computer system 170 may further include a network interface device 180. The computer system 170 also may include an input 182, configured to receive input and selections to be communicated to the computer system 170 when executing instructions. The computer system 170 also may include an output 184, including but not limited to a display, a video display unit (e.g., a liquid crystal display (LCD) or a cathode ray tube (CRT)), an alphanumeric input device (e.g., a keyboard), and/or a cursor control device (e.g., a mouse).

The system 170 may include a data storage device that includes instructions 188 stored in a computer-readable medium 190. The instructions 188 may also reside, completely or at least partially, within the main memory 174 and/or within the processor 172 during execution thereof by the computer system 170, the main memory 174 and the processor 172 also constituting computer-readable medium. The instructions 188 may further be transmitted or received over a network 192 via the network interface device 200.

While the medium 190 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein.

The embodiments disclosed herein include steps that may be performed by hardware components or may be embodied in machine-executable instructions, used to cause a processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored instructions, which may be used to program a computer system (or other electronic devices) to perform a process according to the embodiments disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Various modifications and variations can be made without departing from the spirit or scope of the invention. Since variations of the disclosed embodiments incorporating the spirit of the invention may occur to persons skilled in the art, the invention should be construed to include everything within the scope of the appended claims and their equivalents.

What is claimed is:

1. A radio-frequency (RF) pass-band ripple tuning system for reducing pass-band ripple introduced by a RF filter in a wireless communications system, comprising:
    an electronically tunable equalizer, comprising:
        a pass-band RF signal input configured to receive a wireless pass-band frequency signal;
        at least one resonator coupled to the pass-band RF signal input, the at least one resonator configured to generate at least one resonance frequency on at least one resonator output based on at least one internal capacitance;
        an electronically tunable capacitor circuit, comprising:
            a plurality of capacitance states;
            a capacitance state input configured to receive a selected capacitance state among the plurality of capacitance states; and
            a capacitance state selector configured to couple the selected capacitance state among the plurality of capacitance states to the at least one resonator to modify the at least one resonance frequency on at least one resonator output based on the selected capacitance state;
        a weighted pass-band RF signal output coupled to the at least one resonator output to provide a weighted pass-band frequency signal for the wireless pass-band frequency signal; and
        an attenuator coupled to the pass-band RF signal input and the weighted pass-band RF signal output;
    an RF filter configured to:
        receive the weighted pass-band frequency signal; and
        filter the weighted pass-band frequency signal in the wireless pass-band frequency signal to generate a filtered pass-band frequency signal.

2. The system of claim 1, further comprises a RF pass-band ripple tuning controller, the RF pass-band ripple tuning controller configured to provide a selected capacitance state to the capacitance state input for configuring the electronically tunable capacitor circuit to the selected capacitance state.

3. The system of claim 1, wherein the at least one resonator further comprising:
    a first resonator having a first capacitor and a first inductor, the first resonator configured to generate a first resonance frequency based on the first capacitor and the first inductor.

4. The system of claim 3, wherein the first capacitor has a capacitance of approximately 5.6 picofarad (pF) and the first inductor has an inductance of approximately 8.2 nanohenry (nH).

5. The system of claim 3, wherein the at least one resonator further comprising:
    a second resonator having a second capacitor and a second inductor, the first resonator configured to generate a second resonance frequency based on the second capacitor and the second inductor.

6. The system of claim 5, wherein the second capacitor has a capacitance of approximately 2.4 pF and the second inductor has an inductance of approximately 8.2 nH.

7. The system of claim 1, wherein the electronically tunable capacitor circuit is coupled in parallel to the at least one resonator.

8. The system of claim 4, wherein the electronically tunable capacitor circuit comprises a tunable capacitor, the tunable capacitor coupled in parallel to the first capacitor in the first resonator.

9. The system of claim 8, wherein the tunable capacitor is configured to provide a plurality of capacitance states within a predetermined capacitance range.

10. The system of claim 8, wherein the tunable capacitor is configured to provide 32 capacitance states in 31 frequency steps between 0.5 pF and 4.5 pF, each frequency step is configured to be 0.12 pF.

11. The system of claim 10, wherein the first resonator and the electronically tunable capacitor circuit generate a tunable first resonance frequency between 533 MHz and 712 MHz.

12. The system of claim 1, wherein the pass-band RF signal input of the electronically tunable equalizer is configured to receive the wireless pass-band frequency signal from a RF signal generator.

13. The system of claim 1, wherein the pass-band RF signal input of the electronically tunable equalizer is configured to receive the wireless pass-band frequency signal from a downlink (DL) RF transmitter.

14. The system of claim 1, wherein the pass-band RF signal input of the electronically tunable equalizer is configured to receive the wireless pass-band frequency signal from an uplink (UL) RF receiver.

15. The RF pass-band ripple tuning system of claim 1, wherein:
the electronically tunable equalizer is configured to, for each next frequency step among a plurality of frequency steps of a received pass-band frequency signal:
receive a pass-band frequency signal defined by a next frequency step;
generate an weighted pass-band frequency signal for the pass-band frequency signal defined by the next frequency step for a next capacitance state; and
pass the weighted pass-band frequency signal through a RF filter to generate a filtered pass-band frequency signal defined by a next frequency step for the next capacitance state;
a RF pass-band ripple tuning controller is configured to, for the next frequency step among the plurality of frequency steps of the received pass-band frequency signal:
measure a next output power level of the filtered pass-band frequency signal defined by the next frequency step for the next capacitance state to provide a next filter output power level for the filtered pass-band frequency signal; and
store the next output power level of the filtered pass-band frequency signal defined by the next frequency step for the next capacitance state;
the RF pass-band ripple tuning controller is further configured to, for each next capacitance state among a plurality of capacitance states in the electronically tunable equalizer:
instruct the electronically tunable equalizer to select the next capacitance state among the plurality of capacitance states;
calculating a next pass-band ripple for the next capacitance state based on stored output power levels of the filtered pass-band frequency signal; and
store the next pass-band ripple for the next capacitance state; and
the RF pass-band ripple tuning controller is further configured to:
select a desired pass-band ripple from stored pass-band ripples; and
configure the electronically tunable equalizer to a capacitance state produced the desired pass-band ripple.

16. A method for reducing pass-band ripple in a radio-frequency (RF) filter in a wireless communication system, comprising:
for each next capacitance state among a plurality of capacitance states in an electronically tunable equalizer:
instructing an electronically tunable equalizer to select a next capacitance state among the plurality of capacitance states;
for each next frequency step among a plurality of frequency steps of a received pass-band frequency signal:
receiving a pass-band frequency signal defined by a next frequency step;
generating a weighted pass-band frequency signal for the pass-band frequency signal defined by the next frequency step for the next capacitance state;
passing the weighted pass-band frequency signal through a RF filter to generate a filtered pass-band frequency signal defined by the next frequency step for the next capacitance state;
measuring a next output power level of the filtered pass-band frequency signal defined by the next frequency step for the next capacitance state to provide a next filter output power level for the filtered pass-band frequency signal; and
storing the next output power level of the filtered pass-band frequency signal defined by the next frequency step for the next capacitance state;
calculating a next pass-band ripple for the next capacitance state based on stored output power levels of the filtered pass-band frequency signal; and
storing the next pass-band ripple for the next capacitance state;
selecting a desired pass-band ripple from stored pass-band ripples; and
configuring the electronically tunable equalizer to a capacitance state produced the desired pass-band ripple.

17. The method of claim 16, comprising instructing the electronically tunable equalizer to select a next capacitance state in sequential ascending order from a lower capacitance state to a higher capacitance state among the plurality of capacitance states.

18. The method of claim 16, comprising instructing the electronically tunable equalizer to select a next capacitance state in sequential descending order from a higher capacitance state to a lower capacitance state among the plurality of capacitance states.

19. The method of claim 16, comprising instructing the electronically tunable equalizer to select a next capacitance state in a random order among the plurality of capacitance states.

20. The method of claim 16, comprising receiving the pass-band frequency signal in the electronically tunable equalizer defined by a next frequency step selected in sequential ascending order from a lower frequency step to a higher frequency step among the plurality of frequency steps.

21. The method of claim 16, comprising receiving the pass-band frequency signal in the electronically tunable equalizer defined by a next frequency step selected in sequential descending order from a higher frequency step to a lower frequency step among the plurality of frequency steps.

* * * * *